United States Patent
Lee et al.

(10) Patent No.: US 10,110,151 B2
(45) Date of Patent: Oct. 23, 2018

(54) MOTOR OPERATING SYSTEMS AND METHODS THEREOF

(71) Applicant: PRINCETON TECHNOLOGY CORPORATION, New Taipei (TW)

(72) Inventors: Wen-Jan Lee, New Taipei (TW); Liao-Shun Cheng, New Taipei (TW)

(73) Assignee: PRINCETON TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 15/295,456

(22) Filed: Oct. 17, 2016

(65) Prior Publication Data
US 2018/0048253 A1 Feb. 15, 2018

(30) Foreign Application Priority Data
Aug. 10, 2016 (TW) .............................. 105125389 A

(51) Int. Cl.
*H02P 23/14* (2006.01)
*H02P 23/00* (2016.01)

(52) U.S. Cl.
CPC .......... *H02P 23/14* (2013.01); *H02P 23/0077* (2013.01)

(58) Field of Classification Search
CPC ..................................................... H02P 23/14
See application file for complete search history.

(56) References Cited

U.S. PATENT DOCUMENTS

2013/0202275 A1* 8/2013 Brown ................... H02P 7/29
388/809
2014/0042948 A1* 2/2014 Green ................... H02P 27/04
318/503
2016/0018466 A1* 1/2016 Miklosovic .......... H02P 23/14
702/182

FOREIGN PATENT DOCUMENTS

| JP | 2002223585 A | 8/2002 |
|---|---|---|
| JP | 2007252162 A | 9/2007 |
| WO | WO2013099031 A1 | 7/2013 |

OTHER PUBLICATIONS

Office Action dated Apr. 3, 2018 in JP Application No. 2017-095273, 9 pages.

* cited by examiner

*Primary Examiner* — Muhammad S Islam
(74) *Attorney, Agent, or Firm* — Muncy, Geissler, Olds & Lowe, P.C.

(57) ABSTRACT

A motor operating system includes a parameter-setting module and a control circuit. The parameter-setting module generates a first parameter-setting corresponding to a first operating stage through a user interface, and determines whether a first operating status conforms to a first threshold setting. The control circuit is coupled to a motor, receives the first parameter-setting corresponding to the first operating status, drives the motor according to a first driving signal corresponding to the first parameter-setting, and outputs the first operating status corresponding to the first driving signal. When the first operating status does not conform the first threshold setting, the parameter-setting module generates an adjusted first parameter-setting. When the first operating status conforms the first threshold setting, the parameter-setting module sets the first parameter-setting as a first optimal parameter-setting.

6 Claims, 3 Drawing Sheets

MOTOR OPERATING SYSTEMS AND METHODS THEREOF

CROSS REFERENCE TO RELATED APPLICATIONS

This Application claims priority of Taiwan Patent Application No. 105125389, filed on Aug. 10, 2016, the entirety of which is incorporated by reference herein.

BACKGROUND OF THE INVENTION

Field of the Invention

The application relates in general to a motor operating system and a motor operating method, and in particular to a motor operating system and a motor operating method for respectively setting parameter-settings corresponding to different operating stages of the motor, and applying the corresponding parameter-settings to different operating stages of the motor.

Description of the Related Art

In automation technology, motor technology plays a pivotal role. Each motor has different motor parameter-settings, and they are applied in different situations. Using conventional techniques, a user may run a different operating status by adjusting the external resistance and capacitance, such as by adjusting the resistance and the capacitance for generating a different start time, a lock-on time, or dead-time. However, because the motor has different stages of operation, the performance of the motor cannot be effectively played with by only using one set of parameter-settings for resistance and capacitance during operation of the motor. The problem of how to improve the operation efficiency that corresponds to each stage of the motor needs to be solved immediately.

BRIEF SUMMARY OF INVENTION

An embodiment of the present invention provides a motor operating system, including a parameter-setting module and a control circuit. The parameter-setting module generates a first parameter-setting corresponding to a first operating stage through a user interface, and determines whether a first operating status corresponding to the first parameter-setting conforms to a first threshold setting. The control circuit is coupled to the parameter-setting module and a motor, and includes a buffer, a controller, a driver, a monitor, and a memory. The buffer receives the first parameter-setting. The controller reads the first parameter-setting from the buffer, and generates a first driving signal according to the first parameter-setting. The driver drives the motor according to the first driving signal. The monitor monitors the first operating status of the motor corresponding to the first driving signal, and outputs the first operating status. The memory stores a first optimal parameter-setting. When the first operating status does not conform to the first threshold setting, the parameter-setting module generates a modified first parameter-setting through the user interface. When the first operating status conforms to the first threshold setting, the parameter-setting module sets the first parameter-setting as the first optimal parameter-setting, and stores the first optimal parameter-setting to the memory.

Another embodiment of the present invention provides a motor operating method, including: generating, via a parameter-setting module, a first parameter-setting corresponding to a first operating stage through a user interface, receiving, via a buffer of a control circuit, the first parameter-setting; reading, via a controller of the control circuit, the first parameter-setting from the buffer, and generating a first driving signal according to the first parameter-setting; driving, via a driver of the control circuit, a motor according to the first driving signal; monitoring, via a monitor of the control circuit, the first operating status of the motor corresponding to the first driving signal, and outputting the first operating status; and determining, via the parameter-setting module, whether the first operating status corresponding to the first parameter-setting conforms to a first threshold setting. When the first operating status does not conform to the first threshold setting, the parameter-setting module generates a modified first parameter-setting. When the first operating status conforms to the first threshold setting, the parameter-setting module sets the first parameter-setting as the first optimal parameter-setting, and stores the first optimal parameter-setting to the memory.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present system and method for operating the motor can be applied will become apparent from the detailed description provided herein. It should be understood that the detailed description and specific examples, while indicating exemplary embodiments of the motor operating system and the motor operating method are intended for the purposes of illustration only and are not intended to limit the scope of the invention.

Figure 1:
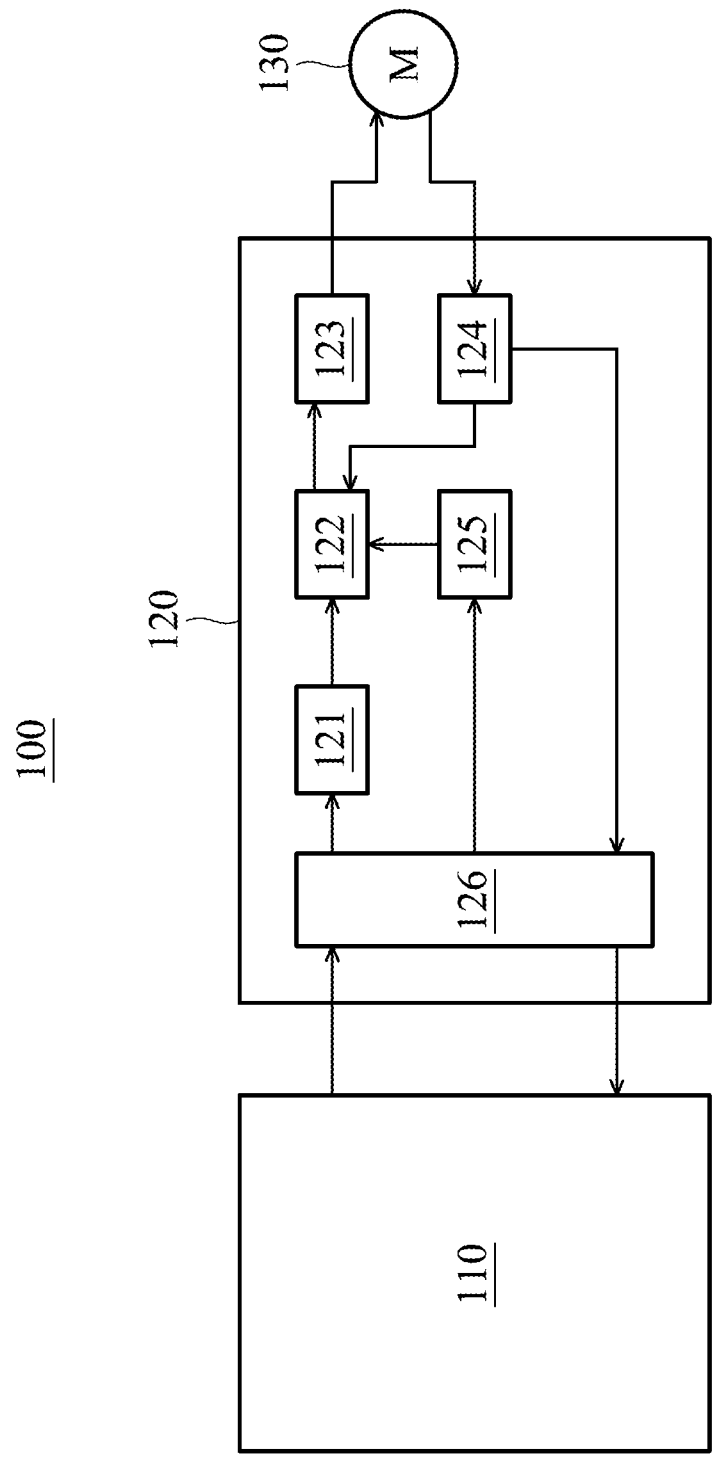
FIG. 1 illustrates a block diagram of the motor operating system in accordance with an embodiment of the invention.

FIG. 1 illustrates a block diagram of the motor operating system in accordance with an embodiment of the invention. As shown in FIG. 1, the motor operating system 100 includes a parameter-setting module 110, a control circuit 120 and a motor 130. The parameter-setting module 110 can be a desktop computer, a laptop computer, or a tablet computer that is able to perform the program threads using a processor. The parameter-setting module 110 is coupled to the control circuit 120 through a bus 126, and performs the parameter-settings corresponding to the motor 130 through a user interface. The bus 126 can be an I2C (Inter-Integrated Circuit) or an SPI (Serial Peripheral Interface Bus), but it is not limited thereto. The control circuit 120 is coupled between the parameter-setting module 110 and the motor 130. The control circuit 120 includes a buffer 121, a controller 122, a driver 123, a monitor 124, a memory 125 and the bus 126. The buffer 121 receives the parameter-settings from the parameter-setting module 110 through the bus 126. The controller 122 loads the parameter-settings from the buffer 121, and performs a logic operation for generating a driving signal according to the parameter-settings. The driver 123 drives the motor 130 according to the driving signal. The monitor 124 monitors the status of the motor 130, and outputs an operating status according to the monitored status. The memory 125 stores a plurality of optimal parameter-settings.

According to an embodiment of the present invention, when the motor operating system 100 operates in a parameter-setting mode, the user is able to set different parameter-settings for each operating stage. For example, in general, the stages of the motor can be divided into three stages: a start-up stage, an operating stage, and a stop stage. Three stages can be distinguished according to the speed of the motor. For example, when the motor speed continues to rise but does not exceed a predetermined threshold, such as 2500 rpm, this means that the motor is in the start-up stage. When the motor speed stays within a predetermined range that is close to the predetermined threshold, this means that the motor is in a stable operating stage. When the motor speed is gradually slowing down, this means that the motor is in the stop stage. It should be noted that the definition of the operating stages described above is only one in an exemplary embodiment. In fact, the user can define more stages corresponding to different situations according to need.

Before setting the parameters, the user can create a lookup table in the parameter-setting module 110 for storing the preferred operating status corresponding to each stage of the motor. For example, when the motor is in the start-up stage, its preferred operating status is to have a surge current that is lower than a predetermined value, or that is within a predetermined range. For example, the surge current might not exceed 20-30% of the operating current. The surge current is associated with motor power. According to an embodiment of the present invention, for a motor of 24V/30 W, when the operating current is 1.2 A, the maximum surge current may exceed twice the operating current, i.e. 2.4 A, and the preferred operating status is for the surge current to be kept below 1.44-1.56 A. When the motor is in the operating stage, the preferred operating status is for the motor speed to change within a predetermined range for making a commutation sound less than a predetermined decibel level, or a predetermined decibel lower than the original commutation sound, such as making the commutation sound 10-20 decibels lower than the original commutation sound. When the motor is in the stop stage, the preferred operating status is for the time required to stop the motor to be less than a predetermined value, such as making the stopping time 20-30% faster than the original stopping time. It should be noted that the definition of the operating stages described above is only one in an exemplary embodiment, and it is not limited thereto. The user enters the parameter-settings corresponding to the test stage to the parameter-setting module 110 through a user interface. The parameter-settings may include a duty cycle; related position; phase angle compensation of a Hall effect sensor; current in the motor coil; the phase angle difference of different motor speeds; reverse electromotive force; phase current; relative relationship of rotor speed to phase inductor; smoothing constant of the motor starts and stops; critical points of over-current; over-voltage; over-temperature; protected critical points; reaction time when spinning up and stalling the motor; and upwind and downwind reaction behavior. The parameter-setting module 110 stores the parameter-settings into the buffer 121 through the bus 126 after entering the parameter-settings. The controller 122 loads the parameter-settings from the buffer 121, performs the logic operation for generating the driving signal, and outputs the driving signal to the driver 123. The driver 123 drives the motor 130 according to the received driving signal. The monitor 124 monitors each parameter of the motor 130 after driving the motor 130, such as the motor speed, the surge current, changing of the speed and the commutation sound, etc., and determines whether the parameters conform to the user's needs. When the feedback parameters conform to the preferred operating status, the parameter-setting module 110 sets the feedback parameters as the best parameters of the test stage, and stores the best parameters to the memory 124. Otherwise, when the feedback parameters do not conform to the preferred operating status, the user is able to re-adjust the parameter-settings through the user interface to make the parameter-setting module 110, the control circuit 120 and the motor 130 repeat the above procedure until the feedback parameters conform to the best operating status.

After the user finishes setting the parameter-settings, the user can set the parameter-settings for another stage, and the procedure is the same as the procedure that is described above, so to streamline the description it is not described again herein. It should be noted that, except for the stages described above, the motor operating system 100 is able to set the parameter-settings of each stage for different types of motors, and it is not limited thereto.

According to another embodiment of the present invention, when the motor operating system 100 runs in an operating mode, the controller 122 may load the stored optimal parameter-settings from the memory 125 according to the operating stage. For example, when the monitor 124 detects that the motor 130 starts operating, i.e. the speed raises from 0 rpm, or the motor 130 receives an active signal, the controller 122 loads the optimal parameter-settings corresponding to the start-up stage from the memory 125. When the monitor 124 detects that the motor speed is remaining within a predetermined range that is nears a predetermined value, such as the motor speed staying within a range of 2300-2700 rpm, the controller 122 determines that the motor 130 is entering the operating stage from the start-up stage, and then loads the optimal parameter-settings corresponding to the operating stage from the memory 125. When the monitor 124 detects that the motor speed is decreasing gradually, or that the motor 130 has received a stop signal, the controller 122 determines that the motor 130 is in the stop stage, and then loads the optimal parameter-settings corresponding to the stop stage from the memory 125.

Figure 2:
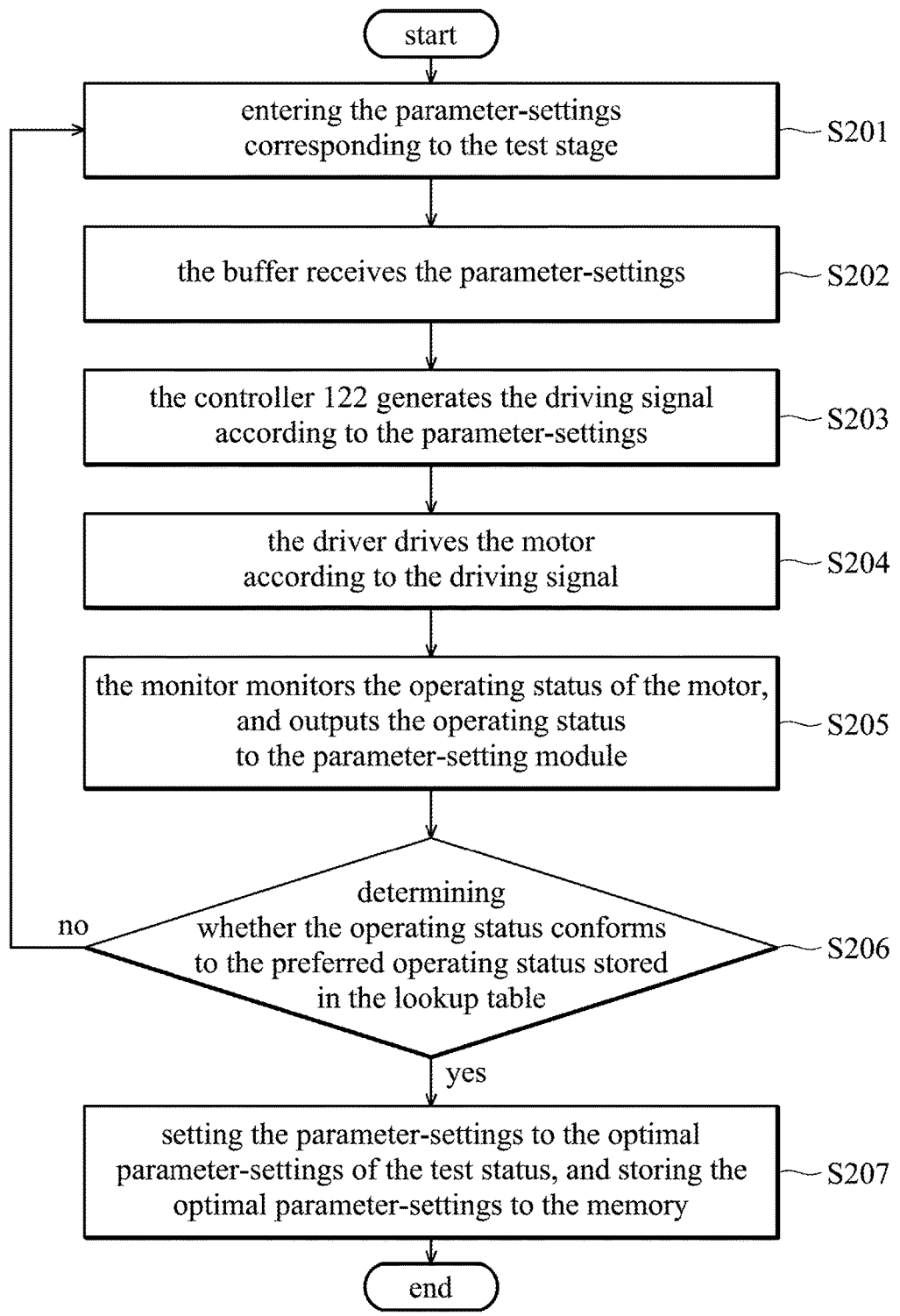
FIG. 2 illustrates a flow chart for setting the parameter-setting corresponding to different stages of the motor in accordance with an embodiment of the invention.

FIG. 2 illustrates a flow chart for setting the parameter-setting corresponding to different stages of the motor in accordance with an embodiment of the invention. In step S201, the user enters the parameter-settings corresponding to the test stage to the parameter-setting module 110 through the user interface. In step S202, the buffer receives the parameter-settings through the bus 126. In step S203, the controller 122 loads the parameter-settings from the buffer 121, and generates the driving signal according to the parameter-settings. In step S204, the driver 123 drives the motor 130 according to the driving signal. In step S205, the monitor 125 monitors the operating status of the motor 130 corresponding to the parameter-settings after the motor 130 is driven, and outputs the operating status to the parameter-setting module 110 through the bus 126. In step S206, the parameter-setting module 110 determines whether the operating status conforms to the preferred operating status stored in the lookup table. When the operating status conforms to the preferred operating status, the method proceeds to step S207, and the parameter-setting module 110 sets the parameter-settings to the optimal parameter-settings of the test status, and stores the optimal parameter-settings to the memory 124. Otherwise, when the operating status does not conform to the preferred operating status, the method returns to step S201, and the user re-enters another parameter-setting to the parameter-setting module 110 through the user interface, and the steps described above are repeated until the operating status of the motor 130 conforms to the preferred operating status.

Figure 3:
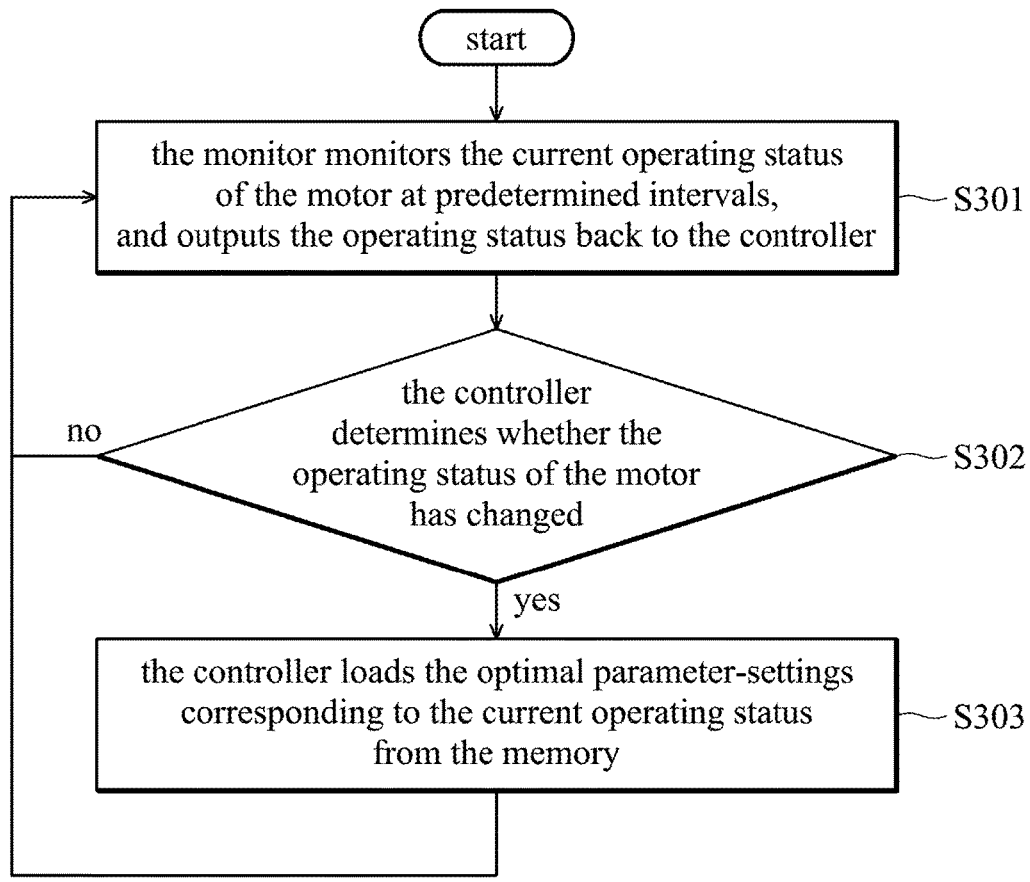
FIG. 3 illustrates a flow chart of the motor operating method in accordance with an embodiment of the invention.

FIG. 3 illustrates a flow chart of the motor operating method in accordance with an embodiment of the invention. In step S301, the monitor 124 monitors the current operating status of the motor 130 at predetermined intervals, and outputs the operating status back to the controller 122. In step S302, the controller 122 determines whether the operating status of the motor has changed. When the operating status has not changed, the method returns to step S301, the monitor 124 monitors the current operating status of the motor 130 at at predetermined intervals. Otherwise, when the operating status changes, the method proceeds to step S303, and the controller 122 loads the optimal parameter settings corresponding to the current operating status from the memory 125. Then the method returns to step S301, and the monitor 124 monitors the current operating status of the motor 130 at predetermined intervals.

As described above, according to the motor operating system and the motor operating method of the present invention, the user may preset the optimal parameter-settings corresponding to each stage of the motor, and when the operating stage of the motor switches, the optimal parameter-settings corresponding to the current operating stage can be applied to improve the operating efficiency of the motor.

It should be noted that the functions of the various modules described herein may be implemented in hardware, software, firmware or combination thereof. If implemented in software, the functions can be stored on or transmitted over as one or more instructions or code on a non-transitory computer-readable medium. The instructions or the code may be, for example, binary, intermediate format instructions such as assembly language, firmware, or source code. The instructions or the code can be accessed and executed by a processor, and the implemented results can be displayed through a user interface on a screen.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:
1. A motor operating system, comprising:
an electronic device, comprising:
a processor, generating a first parameter-setting corresponding to a first operating stage through a user interface, and determining whether a first operating status corresponding to the first parameter-setting conforms to a first threshold setting; and
a first memory, storing a lookup table having the first threshold setting; and
a control circuit, coupled to the electronic device and a motor, comprising:
a buffer, receiving the first parameter-setting;
a controller, reading the first parameter-setting from the buffer, and generating a first driving signal according to the first parameter-setting;
a driver, driving the motor according to the first driving signal;
a monitor, monitoring the first operating status of the motor corresponding to the first driving signal, and outputting the first operating status to the processor of the electronic device; and
a second memory, storing a first optimal parameter-setting;
wherein when the processor determines that the first operating status does not conform to the first threshold setting, the processor modifies the first parameter-setting to generate a modified first parameter-setting through the user interface; and
wherein when the processor determines that the first operating status conforms to the first threshold setting, the processor sets the first parameter-setting as the first optimal parameter-setting, and stores the first optimal parameter-setting to the second memory.

2. The motor operating system as claimed in claim 1, wherein the control circuit further generates a modified first operating status according to the modified first parameter-setting, and the processor further determines whether the modified first operating status corresponding to the modified first parameter-setting conforms to the first threshold setting, the processor re-generates the modified first parameter-setting when the first operating status does not conform to the first threshold setting, and the processor sets the first parameter-setting as the first optimal parameter-setting when the first operating status conforms to the first threshold setting.

3. The motor operating system as claimed in claim 1, wherein the control circuit further comprises a bus, and the processor is coupled to the control circuit through the bus.

4. The motor operating system as claimed in claim 2, wherein:
the processor further generates a second parameter-setting corresponding to a second operating stage and a third parameter-setting corresponding to a third operating stage, the control circuit further generates a second operating status according to the second parameter-setting and a third operating status according to the third parameter-setting,
when the motor is operated in the second operating stage, the processor re-generates a modified second parameter-setting when the second operating status does not conform to a second threshold setting, or sets the second parameter-setting as a second optimal parameter-setting when the second operating status conforms to the second threshold setting, and the processor further stores the second optimal parameter-setting to the second memory, and
when the motor is operated in the third operating stage, the processor re-generates a modified third parameter-setting when the third operating status does not conform to a third threshold setting or sets the third parameter-setting as a third optimal parameter-setting when the third operating status conforms to the third threshold setting, and the processor further stores the third optimal parameter-setting to the second memory.

5. The motor operating system as claimed in claim 4, wherein the controller determines that a current status of the motor is in the first operating stage, the second operating stage or the third operating stage at predetermined intervals, and generates the first driving signal according to the first optimal parameter-setting when the current status is in the first operating stage, generates a second driving signal according to the second optimal parameter-setting when the current status is in the second operating stage, or generates a third driving signal according to the third optimal parameter-setting when the current status is in the third operating stage.

6. The motor operating system as claimed in claim 5, wherein the first operating stage is a start-up stage, the second operating stage is an operation stage and the third operating stage is a stop stage, and wherein the first threshold setting relates to a surge current of the motor, the second threshold setting relates to a commutation sound of the motor and the third threshold setting relates to stopping time of the motor.

* * * * *